C. HOHMANN.
GAS HEATER.
APPLICATION FILED NOV. 30, 1910.
990,268.
Patented Apr. 25, 1911.
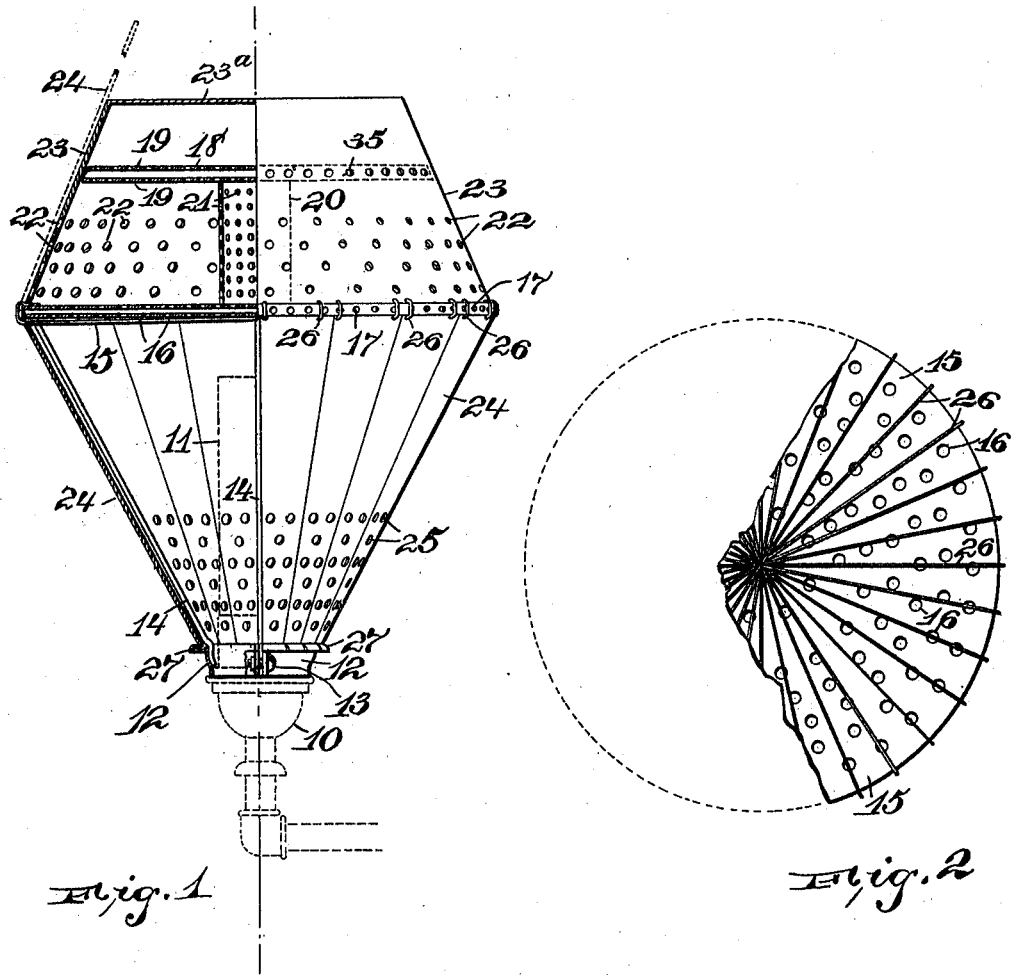
Fig. 1
Fig. 2
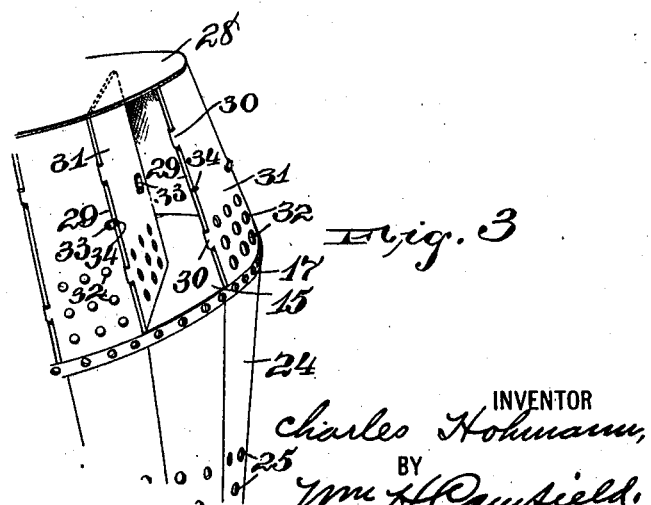
Fig. 3
WITNESSES:
E. A. Pell
M. A. Johnson
INVENTOR
Charles Hohmann,
BY
Wm. H. Caufield.
ATTORNEYS

UNITED STATES PATENT OFFICE.

CHARLES HOHMANN, OF NEWARK, NEW JERSEY.

GAS-HEATER.

990,268. Specification of Letters Patent. Patented Apr. 25, 1911.

Application filed November 30, 1910. Serial No. 594,821.

*To all whom it may concern:*

Be it known that I, CHARLES HOHMANN, a citizen of the United States, residing at Newark, in the county of Essex and State of New Jersey, have invented certain new and useful Improvements in Gas-Heaters; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention consists of a heater which comprises a radiator which receives and distributes the heat from a burner, the radiator resting on a supporting structure which is usually made from wires so as to permit the light from the burner to issue, the supporting structure being adapted to be secured to or removed from a burner, such as a gas burner or a lamp burner.

The invention further consists of inclosing plates which are suspended from the radiator and which can be assembled and fastened together at the bottom to inclose the light from the heater so that it can be used entirely for heating purposes, or which can be swung upward and maintained in their upward positions so that there is no interference with the light from the burner and it is free to be used for lighting purposes.

The invention further consists of means for opening the radiator to regulate the heat that issues therefrom. The radiator has a bottom plate which is directly above the burner, or the chimney of the burner and receives the heat directly therefrom, which is provided with wires strung across the bottom to receive the heat and which are adapted to get red hot and to quickly transmit their heat to the heater plate and thus facilitate the heating of the radiator.

The invention is illustrated in the accompanying drawing, in which—

Figure 1 is a view half in section and half in elevation showing the heater mounted on a burner, the burner being shown in dotted outline. Fig. 2 is a bottom view of the bottom plate partly broken away, and Fig. 3 is a perspective of a part of the heater of a modified form.

The heater is adapted to be mounted on any suitable burner 10, which can be a gas burner or an oil burner, which is provided with a chimney 11. A band 12 is split and provided with a fastening means, such as a lip 13, between its abutting ends whereby it can be clamped around a burner. The band thus forms a clamp which can be fastened around the burner, the clamp having wires 14 projecting up therefrom, which wires form a support for the radiator which it holds above the burner and in such a way that it is a short distance above the chimney and receives the heat from the flame that comes up through the chimney.

The radiator consists of a double heater plate, called the bottom heater plate 15, which is provided with perforations 16 in the top and bottom of the double plate, the double plate having a space between the top and bottom, which space is perforated around the side edges or on its periphery with the openings 17. The upper double heater plate 18, with the perforations 19 in its top and bottom surface, is supported above the double bottom plate and is spaced therefrom by a radiator plate 20 provided with perforations 21, all these plates being adapted to be heated by the heat from the chimney and to radiate the heat through the perforations and through the perforations 22 of the inclosing plate 23 which is connected with the peripheries of the top and bottom double heater plates and has a top 23ª thereon. The inclosing plate is preferably upwardly and inwardly inclined to form a heater section of the shape of a truncated cone.

Pivotally suspended from the outer edge of the bottom of the radiator are the inclosing plates 24 which can be provided with the perforations 25. These inclosing plates for the bottom can be arranged to swing, and the preferred way is to have them suspended on the wires 26, which wires project from the double bottom heater plate and have another function which will be hereinafter described. The inclosing plates 24 can be assembled so that they form a chamber around the chimney, being preferably held by being snapped behind the bead 27 of the band 12, which bead can have a spring action and can be split at intervals so as to hold the inclosing plates against any accidental movement, but permits their being pulled from place by a tug when it is desired to open the bottom part of the heater.

When the heater is to be used at its maximum these inclosing plates are swung shut and snapped into place, and then the heater becomes thoroughly heated and radiates the heat so as to give off considerable heat and quickly warm the room and keep it at a high temperature.

If the burner is to be used for lighting purposes as well as heating, the inclosing plates 24 are removed from their engagement with the bead 27 and are swung upward to the position shown in dotted outline to the left of Fig. 1 where one of the inclosing plates is shown supported against the radiator, the inclined surface of the outside of the radiator forming means for holding the inclosing plates in place. When the inclosing plates are raised to this position shown in dotted outline in Fig. 1 there is no interference with the light from the heater, and it is well adapted for lighting purposes. The wires 26 can be secured to the heater plate 15 in any desired way, but I prefer to extend them across the lower face or surface as shown in Fig. 2, these wires receiving the heat directly from the chimney of the burner and they soon become red hot, they assist the bottom plate in becoming red hot, and they facilitate the heating of the device and also serve to retain considerable heat and then quickly transmit the heat to the different parts of the heater and particularly to the double bottom plate.

A modified form of device is shown in Fig. 3 where the radiator has the top 28 supported on the bottom plate 15 by wires 29 which are spaced apart, each one acting as a support for the hinges 30 of a wing 31, these wings, when all are shut, acting to inclose the radiator and having the openings 32 to permit the heat to issue from the radiator. These wings are normally held shut by latches 33 fitting over studs 34, although other means of locking the wings shut can be devised. When more heat is desired one or more of the wings can be opened, as shown in Fig. 3, and in this way the heat that issues from the radiator can be regulated according to the requirements. Perforations 35 can be made to permit heat to pass out between the top and bottom of the upper double heater plate, as will be evident from an inspection of Fig. 1.

The heater is compact and efficient and combines a heater that can be used entirely for heating, and one that can also be used for heating without interfering with the use of the burner for lighting purposes.

Having thus described my invention, what I claim is:—

1. The combination of a burner, with a heater comprising a radiator, means for supporting the radiator on the burner, and inclosing plates depending from the radiator and adapted to inclose the burner and being adapted to be swung upward against the radiator to permit the use of the burner for lighting purposes.

2. The combination of a burner, with a heater comprising a radiator, a wire support, a clamp on the bottom of the wire support for detachably securing the device to the burner, and inclosing plates depending from the radiator and adapted to be secured to the clamp and arranged to be swung against the radiator to permit the burner to be used for lighting purposes.

3. The combination of a burner, with a heater comprising a radiator having an upwardly and inwardly inclined outer surface and adapted to receive and radiate heat from the burner, a support for detachably securing the radiator above a burner, and inclosing plates arranged to swing on the edges of the radiator and adapted to be detachably secured to the support and being also adapted to be swung upward and lie against the inclined surface of the radiator so that the burner can be used for lighting purposes.

4. The combination of a burner, with a heater comprising a radiator made of horizontal upper and lower double heater plates which are perforated, a perforated inclosing plate surrounding the heater plates, a support, and means on the support for detachably securing it to the burner, the support being secured to the lower of the heater plates whereby the heater plates are maintained above the burner.

5. The combination of a burner, with a heater comprising a radiator formed of an inclosing plate having perforations therein, a lower double heater plate at the bottom of the inclosing plate, an upper double heater plate having perforations therein, the lower heater plate also being perforated, a support for detachably securing the radiator above the burner, and inclosing plates swinging on the periphery of the radiator, the inclosing plates being adapted to be secured in their lowered position and also being adapted to be swung upward and held in their raised positions whereby the burner can be used for lighting purposes.

6. The combination of a burner, with a heater comprising a radiator with an inclosing plate having perforations therein, a lower double heater plate, an upper double heater plate, the heater plates being perforated, a tubular radiating plate extending from one double heater plate to the other and spacing them apart, a support secured to the radiator, a clamp at the bottom of the support for detachably securing it to the burner, and inclosing plates swinging on the edge of the radiator, the inclosing plates and the clamp having co-acting means for detachably holding them together, the inclosing plates being adapted to be swung up against the radiator to permit the burner being used for lighting purposes.

7. The combination of a burner, with a heater comprising a radiator consisting of a lower double heater plate, an upper double heater plate, the upper plate being smaller in diameter than the lower, an upwardly inclined inclosing plate having perforations therein, wires supporting the radiator, a clamp secured to the bottom of the wires for detachably securing the device to the burner, and inclosing plates arranged in swinging relation to the periphery of the radiator, said inclosing plates being adapted to be held together in their lowered position to inclose the burner and also being adapted to be swung upward and lie against the inclined inclosing plate and permit the use of the burner for lighting purposes.

In testimony, that I claim the foregoing, I have hereunto set my hand this 28th day of November 1910.

CHARLES HOHMANN.

Witnesses:
WM. H. CAMFIELD,
E. A. PELL.

Copies of this patent may be obtained for five cents each, by addressing the "Commissioner of Patents, Washington, D. C."